(12) United States Patent
Marquardt

(10) Patent No.: US 8,726,965 B2
(45) Date of Patent: May 20, 2014

(54) METHOD FOR AT LEAST PARTIALLY REWORKING OR REPLACING A REINFORCEMENT ELEMENT OF A FIBRE COMPOSITE STRUCTURE AND ASSOCIATED CONNECTING DEVICE

(75) Inventor: Hans Marquardt, Fredenbeck (DE)

(73) Assignee: Airbus Operations GmbH, Hamburg (DE)

( * ) Notice: Subject to any disclaimer, the term of this patent is extended or adjusted under 35 U.S.C. 154(b) by 195 days.

(21) Appl. No.: 13/208,847

(22) Filed: Aug. 12, 2011

(65) Prior Publication Data

US 2012/0061006 A1    Mar. 15, 2012

Related U.S. Application Data

(63) Continuation of application No. PCT/EP2010/052251, filed on Feb. 23, 2010.

(60) Provisional application No. 61/208,314, filed on Feb. 23, 2009.

(30) Foreign Application Priority Data

Feb. 23, 2009  (DE) .......................... 10 2009 001 075

(51) Int. Cl.
| | | |
|---|---|---|
| B29C 73/00 | (2006.01) |
| B32B 43/00 | (2006.01) |
| B29C 65/00 | (2006.01) |
| B32B 37/00 | (2006.01) |
| B65C 9/25 | (2006.01) |
| C09J 5/00 | (2006.01) |
| B30B 5/02 | (2006.01) |
| B30B 5/04 | (2006.01) |
| B30B 15/34 | (2006.01) |
| B30B 1/23 | (2006.01) |
| B30B 1/32 | (2006.01) |
| B02C 11/08 | (2006.01) |
| B27D 3/00 | (2006.01) |
| B29C 33/02 | (2006.01) |
| B29C 43/52 | (2006.01) |
| B32B 37/06 | (2006.01) |
| B32B 37/08 | (2006.01) |
| D21F 5/00 | (2006.01) |
| D21F 5/02 | (2006.01) |
| F25C 5/14 | (2006.01) |
| F26B 13/00 | (2006.01) |
| H05B 6/00 | (2006.01) |

(52) U.S. Cl.
USPC ............. 156/581; 156/94; 156/228; 156/285; 156/323; 156/583.1; 100/305; 100/269.01

(58) Field of Classification Search
USPC ............... 156/60, 94, 98, 228, 285, 293, 323, 156/349, 381, 580, 581, 583.1, 583.3, 156/583.6, 583.7; 100/35, 38, 70 R, 92, 305, 100/315, 316, 317, 318, 320, 321, 324, 325, 100/326, 214, 231, 269.01, 270
See application file for complete search history.

(56) References Cited

U.S. PATENT DOCUMENTS

| | | | |
|---|---|---|---|
| 2001/0040317 A1 | 11/2001 | Shiraishi et al. | |
| 2003/0075259 A1* | 4/2003 | Graham | .......................... 156/94 |
| 2010/0243152 A1 | 9/2010 | Helfrich et al. | |

FOREIGN PATENT DOCUMENTS

| | | |
|---|---|---|
| CN | 1427754 | 7/2003 |
| DE | 41 01 854 C1 | 6/1992 |
| DE | 4101854 | 6/1992 |
| DE | 10 2007 004 312 | 7/2008 |
| DE | 102007004312 | 7/2008 |
| DE | 10 2007 026 099 | 12/2008 |
| DE | 102007061431 | 6/2009 |
| GB | 2 187 672 A | 9/1987 |
| RU | 2217312 | 11/2003 |
| WO | WO 01/64387 A1 | 9/2001 |
| WO | WO 0164387 | 9/2001 |
| WO | WO 2008/148850 | 12/2008 |

OTHER PUBLICATIONS

German Office Action from DE 10 2009 001 075 dated Oct. 26, 2009.

International Search Report for WO 2010/094808 (PCT/EP2010/052251) dated Aug. 26, 2010.
Russian Decision to Grant for Application No. 2011133776/05 dated May 1, 2013.
Chinese Office Action for Application No. 201080008886.4 dated May 24, 2013.

* cited by examiner

*Primary Examiner* — Michael Tolin
*Assistant Examiner* — Brian R Slawski
(74) *Attorney, Agent, or Firm* — Jenkins, Wilson, Taylor & Hunt, P.A.

(57) ABSTRACT

The invention relates to a method for at least partially reworking or replacing a reinforcement element of a fibre composite structure. In a first method step, at least one fibre layer is arranged on a surface section of the reinforcement element and/or at least one replacement section of the reinforcement element of the same material and same layer structure is arranged on a surface reinforcement section of the fibre composite structure. In a second method step, at least a pressure mat adjusted to the contour of the reinforcement element is disposed above the at least one fibre layer and/or the at least one replacement section of the reinforcement element, wherein the at least one pressure mat is supported and fixed in a nominal position by a fixing frame adjusted to the contour of the reinforcement element. In a third method step, the at least one pressure mat is then acted upon by a pressure medium in order to press the same against the reinforcement element and the fixing frame. In a fourth method step, a hardening of the at least one fibre layer and/or the at least one replacement section of the reinforcement element is carried out. The invention further relates to a corresponding connecting device for carrying out the method.

9 Claims, 7 Drawing Sheets

METHOD FOR AT LEAST PARTIALLY REWORKING OR REPLACING A REINFORCEMENT ELEMENT OF A FIBRE COMPOSITE STRUCTURE AND ASSOCIATED CONNECTING DEVICE

CROSS-REFERENCE TO RELATED APPLICATIONS

This application is a continuation of PCT/EP2010/052251 filed Feb. 23, 2010 and claims the benefit of and priority to U.S. Provisional Application No. 61/208,314, filed Feb. 23, 2009 and German patent application No. 10 2009 001 075.0, filed Feb. 23, 2009 the entire disclosures of which are herein incorporated by reference.

FIELD OF THE INVENTION

The invention relates to a method for at least partially reworking or replacing a reinforcement element of a fibre composite structure. The invention also relates to an associated connecting device.

BACKGROUND OF THE INVENTION

Although they can be applied to any fibre composite structures, the present invention and the problems on which it is based will be described in more detail in relation to a carbon-fibre-reinforced plastics material components (CFRP) of an aircraft structure.

Aircraft components are increasingly being produced, for weight-saving reasons, from fibre composite materials, in particular from carbon-fibre-reinforced plastics material (CFRP). In this case, they have a structure of a plurality of layers of fibre interlaid scrims, which are connected to one another by means of a cured resin matrix, in particular epoxy resin. To produce components of this type, in conventional methods, fibre interlaid scrims impregnated with a resin matrix (in particular epoxy resin) are placed in a plurality of layers in a laminating device. The resin matrix is then cured, for example under the action of elevated temperature and elevated pressure.

According to a conventional method, a component is enclosed for curing in a sack made of pressure-tight film, the interior of which is evacuated by means of a vacuum pump. The component enclosed in this manner is then placed in an autoclave, where it is subjected to elevated pressure.

If reworking operations, such as, the correction of faults, repair of damage and/or modification of components are to be carried out on fibre composite components of this type, in a conventional machining method, for example, preimpregnated fibre layers (prepregs) are fixed using an adhesive film on the surface of the component to be machined and covered with a pressure-tight diaphragm, for example a vacuum sack. The region enclosed under the diaphragm is evacuated. As the required curing pressure is often more than 1 bar, this vacuum sack method cannot be used alone. For this purpose, the component is placed in an autoclave, where it is subjected to elevated pressure to cure the fibre layers.

Therefore, a suitable adhesive device is generally required to receive and support the component to be machined. Alternatively, clamping mechanisms to mechanically apply pressure can also be used.

DE 10 2007 026 099 A1 discloses a device and a method for machining a fibre composite structure, a pressure-tight hood-type mat with the introduction of an excess pressure being disclosed.

During reworking operations on fibre composite components, it is often also necessary to rework not only level faces, but also, for example, reinforcement profiles, for example stringers (i.e. to remove faulty laminate and replace it with a new laminate made of the same material and with the same layer structure).

It is felt to be disadvantageous in this case that additional capacity in the autoclave and in the original adhesive devices leads to extra costs and a loss of time.

Mechanical clamping mechanisms can often only produce a non-uniform pressure distribution and this results in pores and thickness fluctuations. Faulty reworking therefore has to be repeated. When using a pressure-tight hood-type mat, there may be the risk of inadequate stability.

It is therefore one object of the present invention to provide an improved method for at least partially reworking or replacing a reinforcement element of a fibre composite structure, which makes it possible to connect fibre layers for reworking and/or as a replacement in the case of high material quality and precision, without using an autoclave, to the fibre composite structure.

SUMMARY OF THE INVENTION

Accordingly, a method is provided for at least partially reworking or replacing a reinforcement element of a fibre composite structure. Initially, at least one fibre layer is arranged on a surface portion of the reinforcement element and/or of at least one replacement portion of the reinforcement element made of the same material and with the same layer structure is arranged on a surface reinforcement portion of the fibre composite structure. At least one pressure mat adapted to the contour of the reinforcement element is then arranged over the at least one fibre layer and/or the at least one replacement portion of the reinforcement element, the at least one pressure mat being supported and fixed in a desired position by a fixing frame adapted to the contour of the reinforcement element. A pressure medium is then applied to the at least one pressure mat in order to press it against the reinforcement element and the fixing frame. Finally, the at least one fibre layer and/or the at least one replacement portion of the reinforcement element is cured.

Furthermore, a connecting device is provided for connecting at least one fibre layer arranged on at least one surface portion of a reinforcement element to the reinforcement element and/or for connecting at least one replacement portion made of the same material and with the same layer structure of the reinforcement element on a surface reinforcement portion of the fibre composite structure to said fibre composite structure. The connecting device has at least one pressure mat, which is adapted to the contour of the reinforcement element and is arranged over the reinforcement element. Furthermore, a fixing frame adapted to the contour of the reinforcement element is provided to support and fix the pressure mat. The connecting device also has a counter bearing for mounting the fibre composite structure.

Reinforcement elements are, for example, stringers with different profile forms, such as T-stringers, omega-stringers, A-stringers and also formers and the like. The fibre composite structure may, for example, be a shell component of an aircraft.

By using the fixing frame, the pressure mat, which is placed under pressure by a medium, for example compressed air, is supported and permits the curing of the neighbouring layers or replacement portions within a narrow tolerance range. A uniform pressure distribution is achieved in the process, which results in a pore-free curing and connection with a uniform pressure distribution. Therefore, not only flat, in other words two-dimensional regions and portions, but also three-dimensional portions or elements can be machined.

Thus, different cases of reworking can be covered, such as reworking a faulty portion on a reinforcement profile, at least one arranged fibre layer being arranged on the reinforcement element. It is also possible for at least one new replacement portion of a reinforcement element to replace a faulty portion which has been completely or partially removed. Likewise, an entire faulty reinforcement element which has had to be removed completely can be replaced.

It is advantageously possible, in this case, to use the same material and the same layer structure of the at least one fibre layer and/or the at least one new replacement portion as in the original component.

The at least one fibre layer and/or the at least one replacement portion of the reinforcement element can be preformed prior to its arrangement and then applied, uncured, partially cured or cured, with an adhesive.

It is of particular advantage, in this case, that no container surrounding the entire fibre composite structure, such as an autoclave, is required.

The counter bearing provided on the lower side of the fibre composite structure is adapted to the contour of the fibre composite structure and, on receiving the connecting device in a suitable pressure frame, produces the advantage that the entire component, i.e. the fibre composite structure with the portion or part to be machined, is practically load-free, the pressure frame primarily receiving and supporting the fixing frame and the counter bearing. As a result, deformations are avoided at high curing temperatures. A further advantage, in this case, is that the same material as for the original component can be used for the reworking operations.

It is also possible for the reworking region to be covered by means of a vacuum film, so a limited negative pressure region can be established by sealing the vacuum film on the fibre composite structure, the negative pressure region being evacuated in the method step of applying a pressure medium to the at least one pressure mat. A pressure increase with a particularly uniform pressure distribution can thereby be achieved in the vacuum film method.

The at least one fibre layer and/or the replacement portion is cured by heating, for example by heating elements which are integrated into and/or on the pressure mat. The at least one fibre layer and/or the at least one replacement portion is cured by heating in accordance with a curing temperature of a resin matrix system of the fibre layer and/or the at least one replacement portion. For example, the fibre layer may be heated, in this case, to a temperature of 125° C. to 180° C., in accordance with a resin matrix used.

The counter bearing may also be equipped with at least one counter bearing heating element. At least one additional heating element is also possible. A good heat distribution is thus achieved.

A further advantageous heat distribution is achieved in that the heat-transmitting pressure faces, which are in contact with the at least one arranged fibre layer on the reinforcement element and/or the at least one new replacement portion of the reinforcement element and/or the fibre composite structure, are equipped with a metal film for uniform heat distribution. This metal film may also be flexible.

It is provided that the at least one pressure mat has at least one pressure chamber for a pressure medium to which pressure can be applied. The pressure medium may, for example, be air, gas or else a liquid.

The at least one pressure mat may have at least one reinforcement element in flexurally rigid regions. The pressure mat is advantageously adapted to the contour of the portion or component to be machined, the at least one reinforcement element also being able to have a contour-adapted shape.

A contour adaptation may also be provided for the at least one heating element. The at least one heating element may also be arranged as an individual part between the pressure mat and the portion to be machined, it being contour-adapted and it also being possible for it to have a function as a pressure piece. It is also possible for the at least one heating element to be flexible in order to allow a still better surface contact and therefore better heat transmission.

The at least one heating element is advantageously replaceable, even if it is integrated into the pressure mat and/or the counter bearing, in which case, if it fails, the pressure mat or the counter bearing is not lost at the same time.

Furthermore, the pressure mat may have an articulated portion, which is arranged, for example, between two flexurally rigid portions, and makes it possible for the pressure mat to be easily removed after the end of the reworking, in that it can be pivoted up about this articulated portion.

The at least one fixing frame may have a first fixing unit for fixing horizontal regions of the pressure mat and a second fixing unit for fixing the reinforcement element, the second fixing element being provided with at least one side fixing element for the lateral fixing of the reinforcement element. A lateral fixing of this type may, for example, be implemented by lateral pressure components with wedge faces, which, in particular, fix a web region of a reinforcement element. In this case, these fixing units may be adjustable, for example mechanically, pneumatically and/or hydraulically. The fixing frame may also be adapted to the contour of the part to be machined. It fixes the pressure mat in its desired position and ensures contour accuracy. The pressure mat, to which pressure is applied, may be supported on the fixing frame and thus act on the portion of the reinforcement element to be machined.

The freedom from a load owing to the counter bearing and fixing frame in a pressure frame produces, in particular in the case of thin-walled components, the advantage that no deformations occur, since during curing the curing temperature of the starting material is reached again and loading of the part would lead to deformations.

BRIEF DESCRIPTION OF THE DRAWINGS

The invention will be described in more detail below with the aid of embodiments with reference to the accompanying figures of the drawings, in which.

The same reference numerals designate like or functionally equivalent components in the figures, unless stated otherwise.

DETAILED DESCRIPTION OF THE INVENTION

Figure 1:
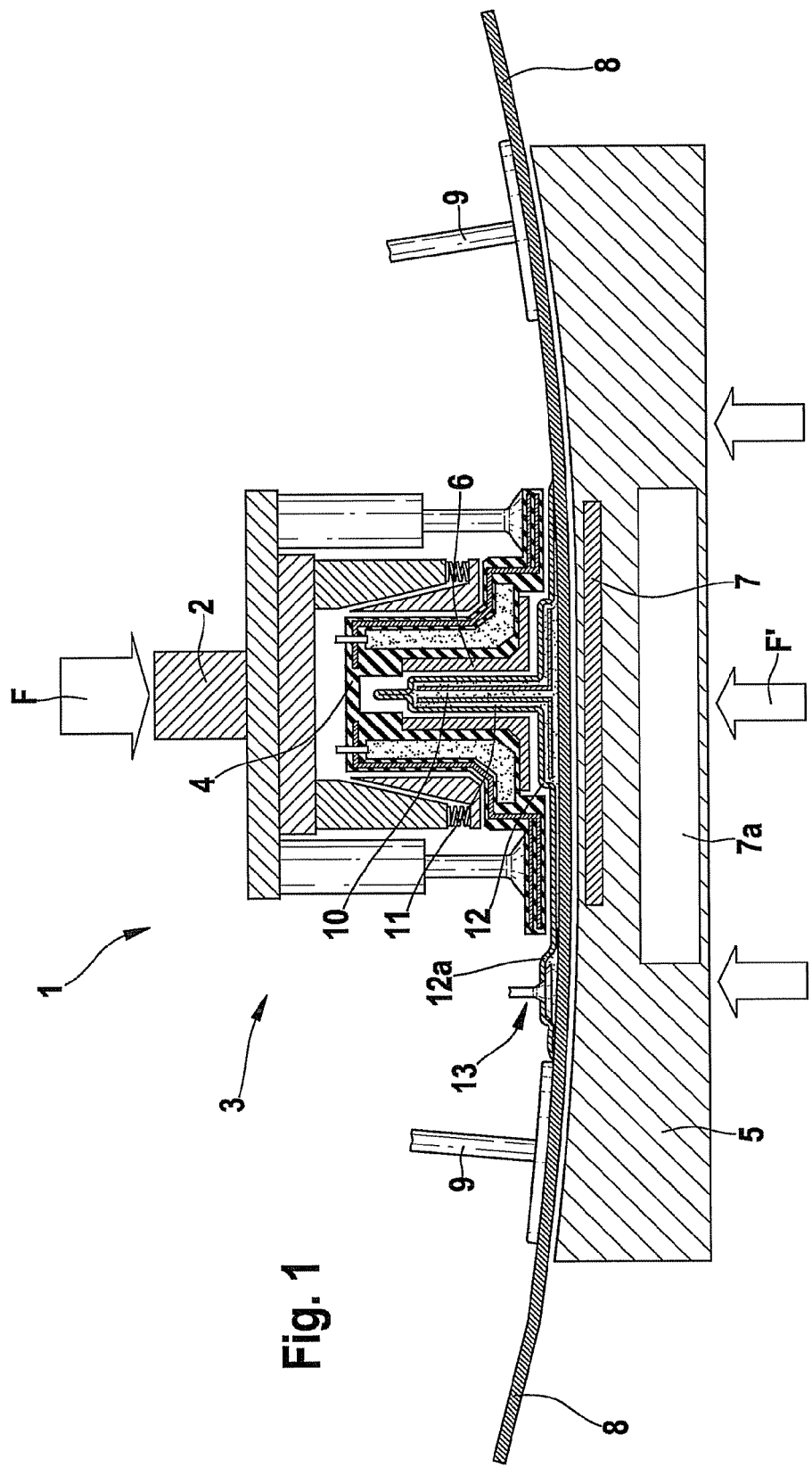
FIG. 1 is a schematic cross-sectional view of a connecting device according to an embodiment of the invention.
Figure 2:
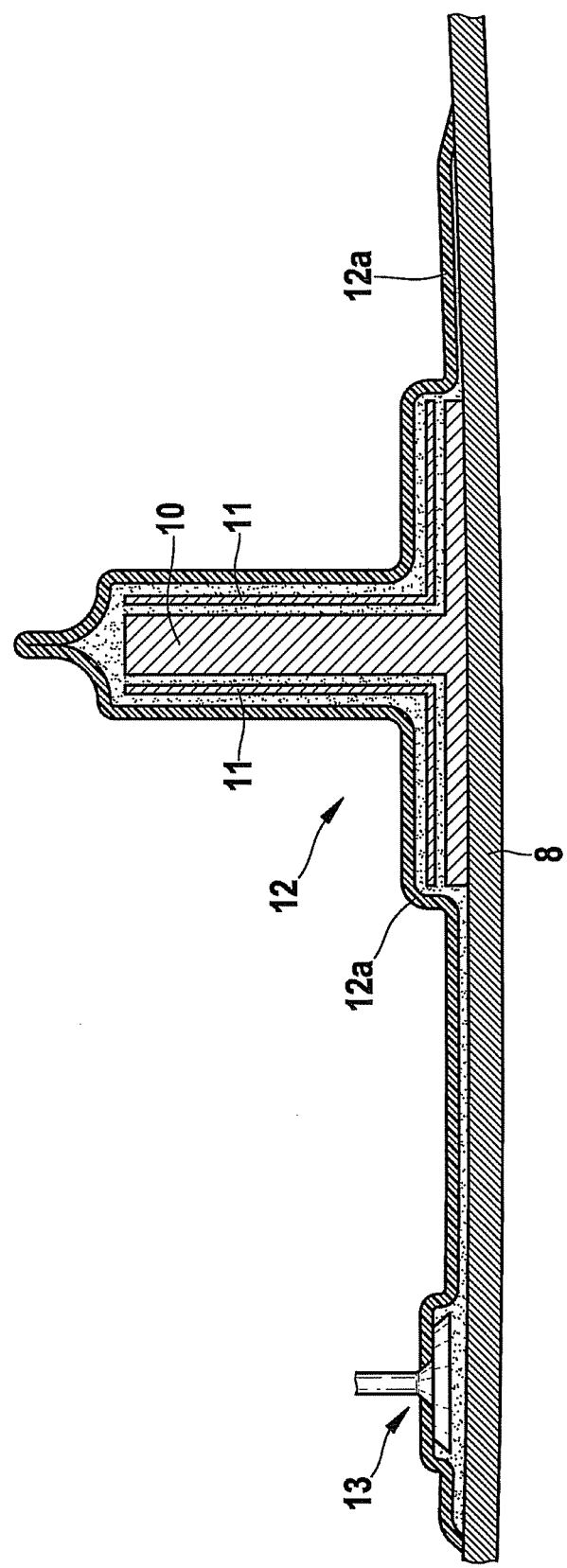
FIG. 2 is a schematic, enlarged cross-sectional view of a reinforcement element to be machined, provided with vacuum film.

FIG. 1 is a schematic cross-sectional view of a connecting device 1 according to an embodiment of the invention and FIG. 2 illustrates a schematic, enlarged cross-sectional view of a reinforcement element 10 to be machined.

The view is a cross-sectional view, but the reinforcement element 10 is to be imagined three-dimensionally standing on the plane of the drawing in its longitudinal direction.

An already cured fibre composite structure 8, for example a shell component of a fuselage portion of an aircraft, is reinforced with first reinforcement elements 9 and second reinforcements element 10 in a direction perpendicular to the drawing. These reinforcement elements 9, 10 are configured as so-called T-stringers and also already cured, being attached by a foot portion to the fibre composite structure 8, their webs pointing upwards in this case. The fibre composite structure 8 is held in a counter bearing 5, which is arranged in a pressure frame 2 (see FIG. 7).

The second reinforcement element 10 is a component which is to be machined and on which fibre layers 11 with an L-shaped cross-section are arranged on either side in a reworking region 12. Portions of this reinforcement element 10 were faulty in the reworking region 12 in this example, had been milled off, for example, and are now to be returned to full size. The fibre layers 11 had already been prefabricated in this case, for example in a preceding production step with the L-shaped cross-section, and they may be uncured, partially cured or else cured. They are attached by a suitable adhesive or matrix material, for example epoxy resin, to this component 10 to be machined.

In this embodiment, the arrangement of the L-shaped fibre layers 11 is covered by a vacuum film 12a and a so-called Peelply (dashed lines) (see also FIG. 2) and sealed at the edges in such a way that a negative pressure region is established between the vacuum film 12a and the fibre composite structure 8, said region being connectable by a vacuum connecting piece 13 to a vacuum source for evacuation.

Heating elements 6, which are also L-shaped and therefore adapted to the contour of the reinforcement element 10 to be machined, are applied on either side by means of this arrangement. They will be described in more detail with respect to their structure below.

A pressure mat 4 with a contour corresponding to the reinforcement element 10 is arranged over the heating elements 6 in such a way that the pressure mat 4 receives the heating elements 6 on its inside. The heating elements 6 may, in this case, be attached to the pressure mat 4 or configured as separate parts. The pressure mat 4 covers the arrangement and has foot portions on either side, which extend on either side of the reinforcement element 10 over the vacuum film 12a as well. The pressure mat 4 will be described in more detail below.

The pressure mat 4 is fixed by a fixing frame 3 in its desired position. The fixing frame 3, which will be described in more detail below, has an inner portion, which fixes the pressure mat 4 in the region of the web of the reinforcement element 10 from both sides and at the bottom in the perpendicular direction. Furthermore, outer portions of the fixing frame 3 are provided to fix the foot portions of the pressure mat 4 on the fibre composite structure 8.

The fixing frame 3 is arranged in the pressure frame 2 (only indicated) (see FIG. 7), which absorbs a reaction force F of the fixing frame 3. A counter bearing 5 is also held in the pressure frame 2 and transmits reaction forces F', the fixing frame 3 and counter bearing 5 being supported in such a way that the fibre composite structure 8 is practically load-free.

The counter bearing 5 in this example is provided with at least one counter bearing heating element 7, which is arranged close to the portion of the fibre composite structure 8 on which the reinforcement element 10 to be machined is arranged. The counter bearing heating element 7 may also consist of a plurality of heating elements. The counter bearing 5 may also have an additional heating element 7a for improved heat transmission and distribution.

Figure 3:
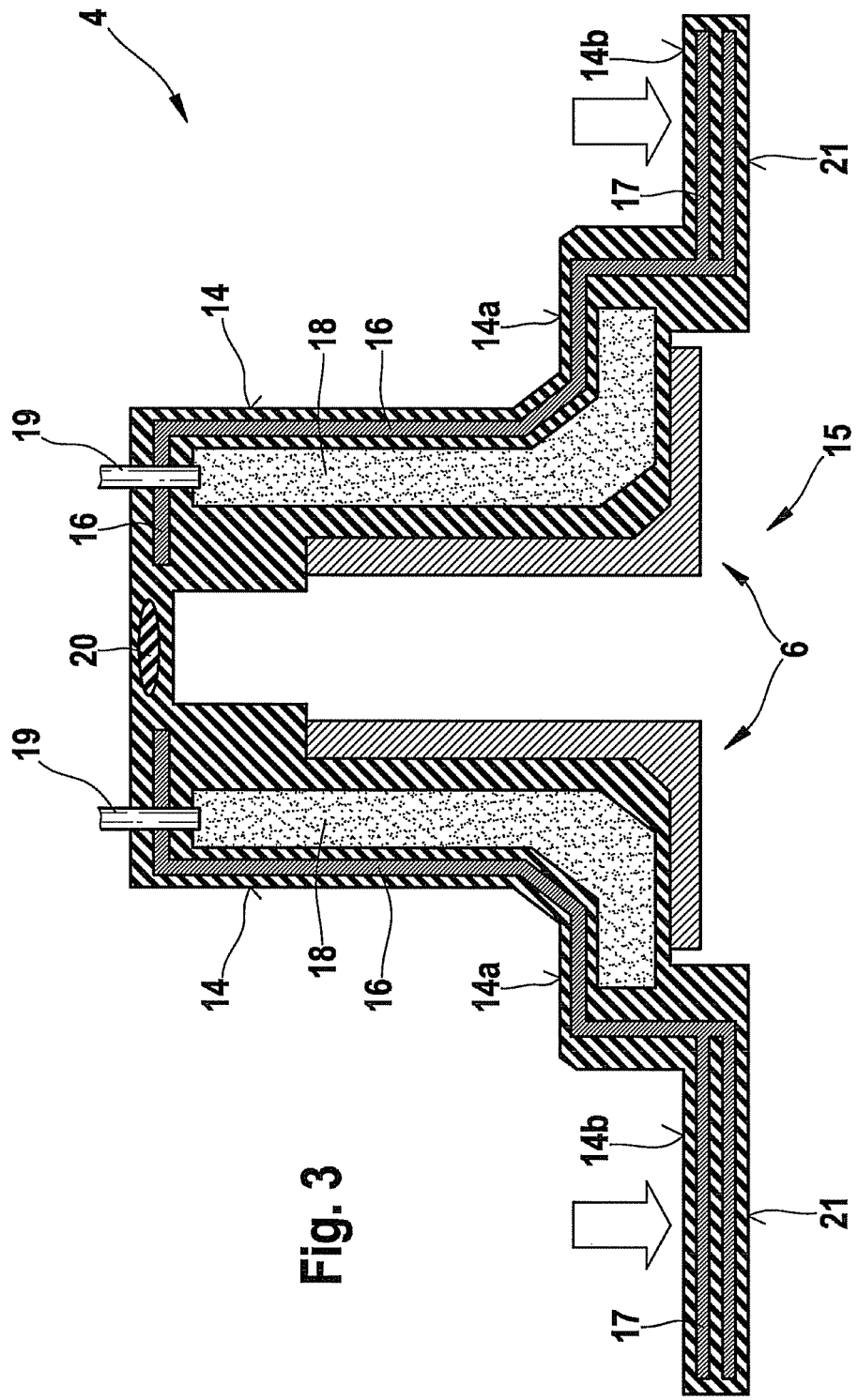
FIG. 3 is a schematic, enlarged cross-sectional view of a pressure mat according to FIG. 1.

FIG. 3 is a schematic, enlarged cross-sectional view of the pressure mat according to FIG. 1.

The pressure mat 4 is configured substantially symmetrically about its vertical axis with two opposing sub-portions. The two opposing sub-portions are substantially flexibly connected at the top to an articulated portion 20 so as to be pivotable about the latter and enclose a receiving portion 15 located between them for the reinforcement element 10 to be machined (see FIGS. 1 and 2), to the contour of which they are adapted. Within the receiving portion 15, a heating element 6 is arranged, in each case, on each side, either integrated on the pressure mat 4 or loosely as a separate component. A pressure chamber 18 with a respective pressure chamber connection 19 for a pressure medium to be applied is arranged, in each case, inside each of the opposing sub-portions of the pressure mat 4. Furthermore, the two sub-portions are provided with reinforcement elements 16, for example metal wire gratings or the like, in flexurally rigid regions. These flexurally rigid regions, in this example, are first pressure portions 14 for the lateral fixing by means of the inner portion of the fixing frame 3, second pressure portions 14a for the perpendicular fixing of the inner portion of the fixing frame 3 and third pressure portions 14b for the perpendicular fixing by means of the outer portions of the fixing frame 3. Additional reinforcements 17 are provided in this case in the foot portions, in particular in the third pressure portions 14b.

The pressure mat 4 may, for example, be produced from a rubber-like or resilient plastics material. The articulated portion 20 is used to facilitate an application and demoulding of the pressure mat 4.

Figure 4:
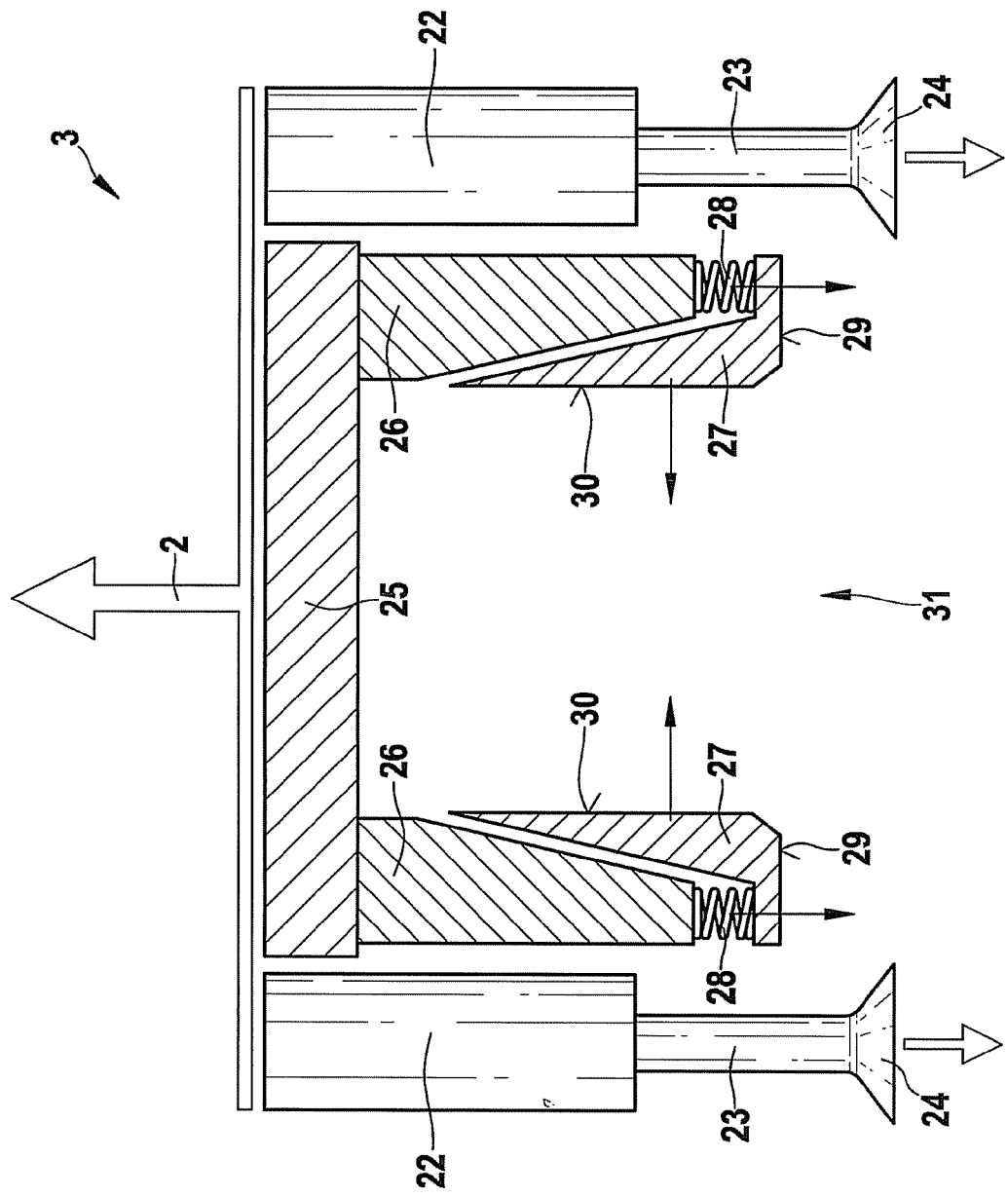
FIG. 4 is a schematic, enlarged cross-sectional view of a fixing frame according to FIG. 1.

FIG. 4 schematically illustrates the fixing frame 3 in a side view.

The fixing frame 3 comprises outer portions 22 to 24 and inner portions 25 to 29. An outer portion comprises a first fixing unit 22 with a punch 23, which has a foot 24 on its lower end. The outer portions surround a receiving region 31, in which the arrangement with the pressure mat 4 and the reinforcement element 10 to be machined is arranged, as illustrated in FIG. 1. The outer portions may be arranged in succession in the longitudinal direction of the reinforcement element, i.e. perpendicular to the plane of the drawing, in a multiple configuration in accordance with the length of the portion to be machined.

These first fixing units 22 to 24 form perpendicular pressure components, the feet 24 being provided to fix the horizontal third pressure portions 14b of the pressure mat 4 (see FIGS. 3 and 1). The first fixing units 22 may, for example, be adjustable mechanically (screw spindle), pneumatically and/or hydraulically.

The inner portion of the fixing frame 3 has second fixing units 26 on either side of the receiving portion 31, which are attached to a body 25. The first fixing units 26 in each case cooperate with side fixing elements 27 by means of lateral wedge faces and by means of springs 28 in the perpendicular direction. The springs 28 exert a perpendicular pressure force on the side fixing elements 27 in such a way that foot portions 29 of the side fixing elements 27 act on the second pressure portions 14a of the pressure mat 4 (see FIGS. 3 and 1) and fix them. The springs 28 may be adjustable for pressure equalisation.

Furthermore, the side fixing elements 27 are provided for lateral fixing of the reinforcement element 10 to be machined, in this example the web of the T-stringer. The lateral fixing forces can be adjusted by means of the wedge faces and suitable adjusting means.

If the pressure chambers 18 of the pressure mat 4 have pressure applied by means of a pressure medium, the outer, i.e. first pressure portions 14 of the pressure mat 4 are supported on the side fixing elements 27 and the second pressure portions 14a of the pressure mat 4 are supported on the foot portions 29 of the fixing frame 3 (see FIG. 1). The inner faces in the receiving portion 15 of the pressure mat 4 (see FIG. 3) transmit the pressure forces via the heating elements 6 onto the reinforcement element 10 to be machined, both in the lateral direction and in the direction perpendicular thereto (in this example).

Figure 5:
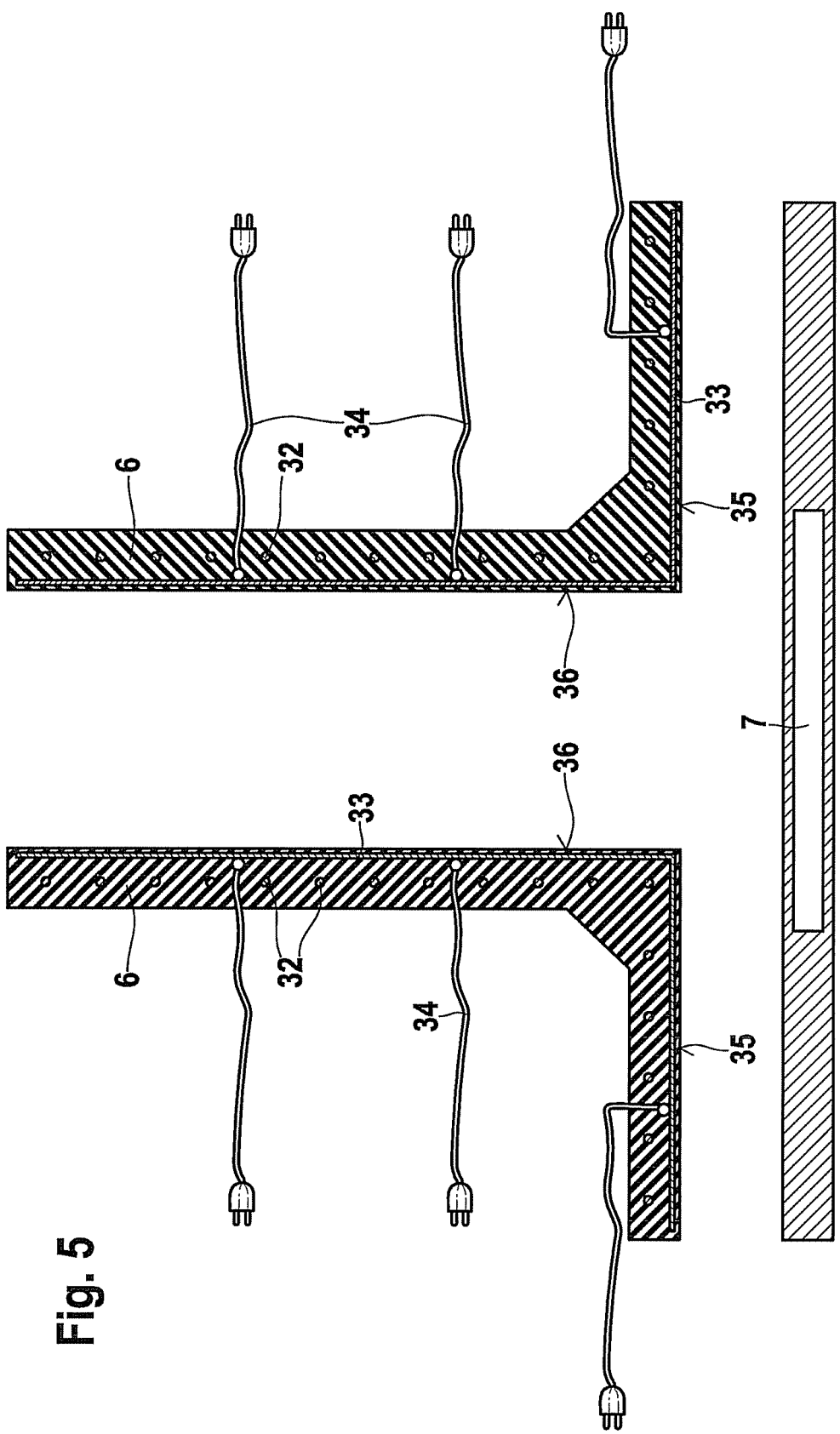
FIG. 5 is a schematic, enlarged cross-sectional view of two heating elements according to FIG. 1.

In this example, the heating elements 6 are configured as pressure pieces and adapted to the contour of the reinforcement element 10 (T-stringer), as shown in a schematic side view in FIG. 5. These heating elements 6 may be flexible, with their material having to be resistant to the materials of the fibre layers 11 used and the curing temperatures. Conductive tracks 32 (course perpendicular to the plane of the drawing) are arranged within the heating elements 6, in this example, for electric heating. Those surfaces of the heating elements 6, which are in contact with the portions to be machined, are covered in this case with metal foils 33, which may also be flexible, as heat distribution elements. The metal foils 33 produce a uniform heat distribution, i.e. the transmission, over the first contact portions 35 and second contact portions 36 on the material of the fibre layers 11 to be machined, i.e. cured.

Furthermore, the heating elements 6 are provided with temperature sensors 34, for example thermal elements, for temperature measurement. The temperature sensors are arranged close to the metal foils 33 in the bodies of the heating elements 6 and electrically connected to a temperature regulator (not shown).

The metal foils 33 may, for example, consist of copper, aluminium or lead.

Furthermore, the counter bearing heating element 7 is also shown schematically in FIG. 5 and can have the same structure as the heating elements 6 described above. This also applies to the additional heating element 7a.

Figure 6:
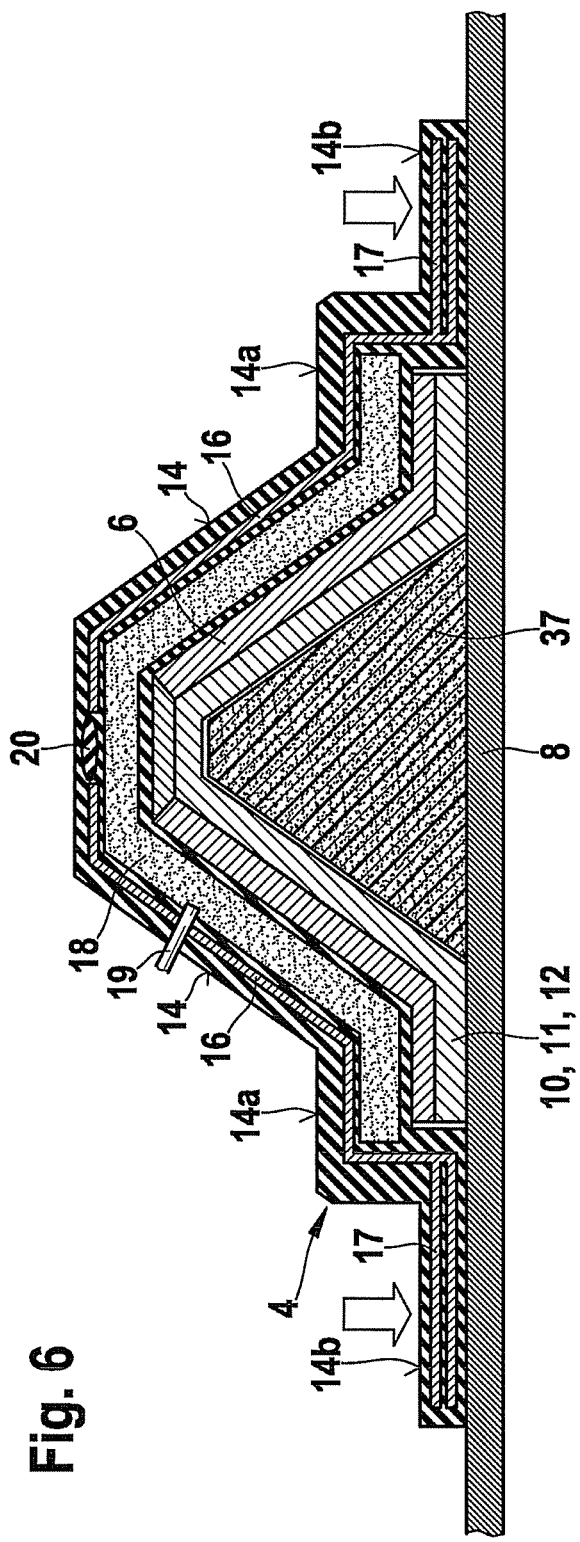
FIG. 6 is a schematic cross-sectional view of a further pressure mat and a further reinforcement element.

FIG. 6 is a schematic cross-sectional view of a further pressure mat 4 and a further reinforcement element 10.

This reinforcement element 10 is configured as a so-called A-stringer and has an interior, which is provided with a rigid support structure 37, for example a core element as a foam core, or a flexible support structure, such as a vacuum hose, during the reworking. A replacement portion made of wet layers of the reworking is shown here (in cross-section), formed as an A-stringer. In this example, only one heating element 6 is arranged over the portion to be machined. The heating element 6 is adapted to the contour of the A-stringer, as is the pressure mat 4 arranged thereabove.

The pressure mat 4 has the articulated portion 20 and a continuous pressure chamber 18 with a pressure chamber connection 19. The first pressure portions 14 of the pressure mat 4 are inclined in accordance with the contour of the A-stringer. Accordingly, the side fixing elements 27 of the associated fixing frame 3 are also inclined, which is not shown, but can easily be imagined. The second and third pressure portions 14a and 14b of the pressure mat 4 are horizontal in this case, as in FIG. 1 and FIG. 3. The pressure mat 4 is also provided with reinforcement elements 16 in the flexurally rigid regions, as described above.

Figure 7:
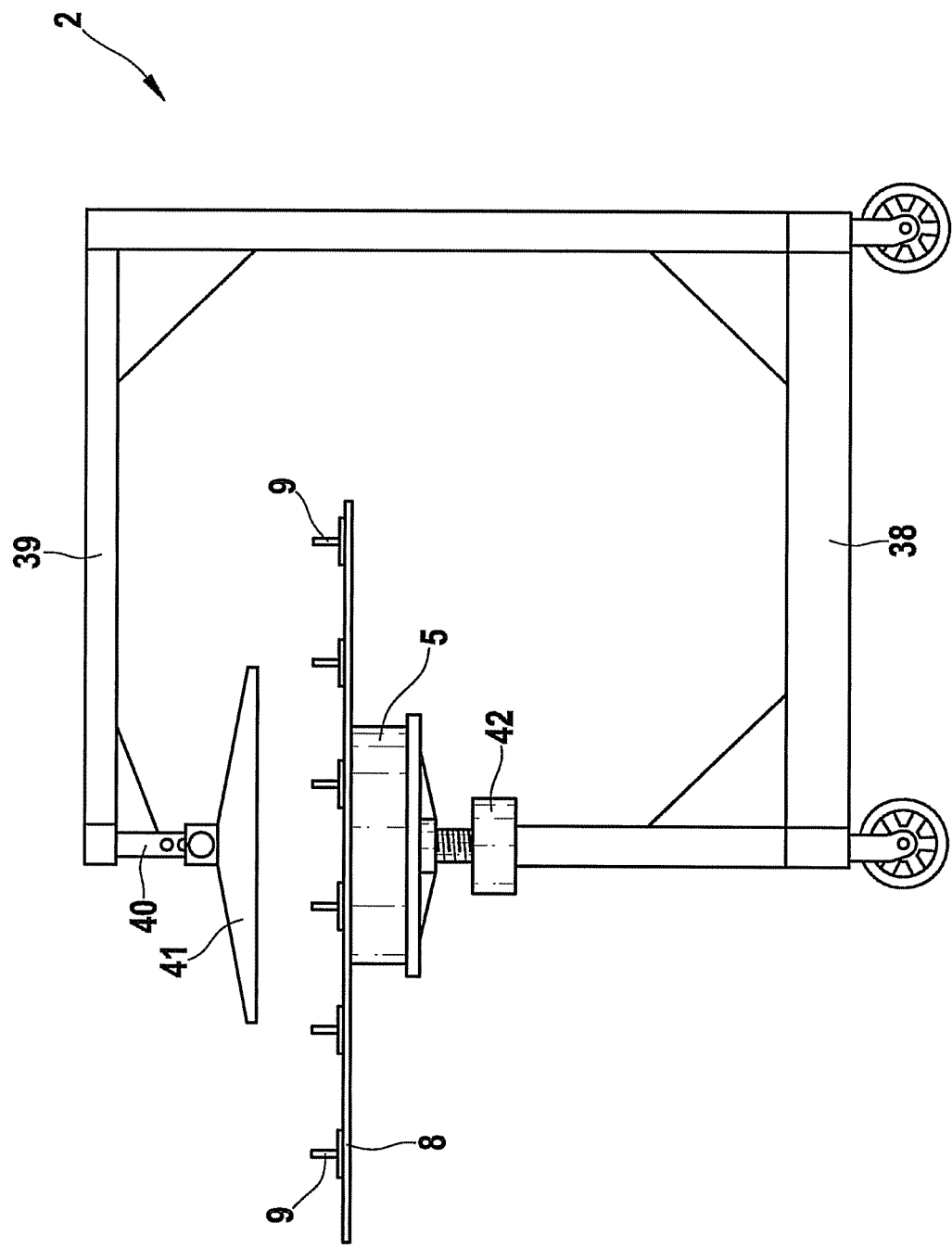
FIG. 7 is a schematic side view of a pressure frame for the connecting device according to the invention.

FIG. 7 is a schematic side view of a pressure frame 2 for the connecting device 1 according to the invention in a side view.

The pressure frame 2 has a movable frame 38 in this case, which carries a spar 39 in a gallows-like configuration, to one end of which a holding arm 40 with a receiving means 41 is connected. A counter bearing receiver 42 is attached to the frame 38 below the holding arm 40 and vertically adjustably carries the counter bearing 5. Only the fibre composite structure 8 with reinforcement elements 9 is shown on the counter bearing 5 in this case, the connecting device 1 according to FIG. 1 still having to be attached, which can easily be imagined.

The receiving means 41 is adapted for connection to the fixing frame 3. The entire connecting device 1 can be fixed by the imaginable counter bearing receiver 5 in the manner described above.

Although the present invention has been described in the present case with the aid of preferred embodiments, it is not limited thereto, but can be modified in diverse ways.

For example, the pressure mat 4 may consist of a plurality of pressure mats 4.

The fixing frame 3 may have more units than those shown.

The invention provides a method for at least partial reworking or replacement of a reinforcement element 10 of a fibre composite structure 8. In a first method step, at least one fibre layer 11 is arranged on a surface portion of the reinforcement element 10 and/or at least one replacement portion of the reinforcement element 10 made of the same material and with the same layer structure is arranged on a surface reinforcement portion of the fibre composite structure 8. In a second method step, at least one pressure mat 4 adapted to the contour of the reinforcement element 10 is then arranged over the at least one fibre layer 11 and/or the at least one replacement portion of the reinforcement element 10, the at least one pressure mat 4 being supported and fixed in a desired position by means of a fixing frame 3 adapted to the contour of the reinforcement element 10. In a third method step, a pressure medium is then applied to the at least one pressure mat 4, in order to press it against the reinforcement element 10 and the fixing frame 3. Finally, a curing of the at least one fibre layer 11 and/or the at least one replacement portion of the reinforcement element 10 takes place in a fourth method step. The invention furthermore provides a corresponding connecting device 1 for carrying out the method.

What is claimed is:

1. Connecting device for connecting at least one fibre layer arranged on at least one surface portion of a reinforcement element to the reinforcement element and/or for connecting at least one replacement portion made of the same material and same layer structure of the reinforcement element on a surface reinforcement portion of a fibre composite structure to said fibre composite structure, comprising:

at least one pressure mat, which is adapted to the contour of the reinforcement element and which has at least one pressure chamber for a pressure medium to which pressure can be applied and is arranged over the at least one fibre layer and/or the at least one replacement portion of the reinforcement element;

a fixing frame adapted to the contour of the reinforcement element for supporting and fixing the pressure mat; and a counter bearing for mounting the fibre composite structure, wherein the at least one fixing frame has a first fixing unit for fixing horizontal regions of the pressure mat and a second fixing unit for fixing the reinforcement element, the second fixing unit being provided with at least one side fixing element for the lateral fixing of the reinforcement element, wherein the second fixing unit and the at least one side fixing element are connected by at least one spring that exerts a pressure force on the at least one side fixing element in such a way that the at least one side fixing element acts on the pressure mat and fixes it.

2. Connecting device according to claim 1, wherein the at least one pressure mat has at least one reinforcement element in flexurally rigid regions.

3. Connecting device according to claim 1, wherein the at least one pressure mat has an articulated portion.

4. Connecting device according to claim 1, wherein at least one heating element is provided integrated into the pressure mat and/or attached thereto in a manner adapted to the contour of the reinforcement element.

5. Connecting device according to claim 1, wherein at least one heating element is arranged between the pressure mat and the at least one fibre layer and/or the at least one replacement portion as a separate component, in a manner adapted to the contour of the reinforcement element.

6. Connecting device according to claim 4, wherein at least one counter bearing heating element is arranged in and/or on the counter bearing.

7. Connecting device according to claim 1, wherein heat-transmitting pressure faces, which are in contact with the at least one arranged fibre layer on the reinforcement element and/or the at least one new replacement portion of the reinforcement element and/or the fibre composite structure, are equipped with a metal foil for uniform heat distribution.

8. Connecting device according to claim 1, wherein the second fixing unit and the at least one side fixing element each comprise a lateral wedge face, wherein the second fixing unit cooperates with the at least one side fixing element by the lateral wedge faces.

9. Connecting device according to claim 1, wherein the spring is adjustable for pressure compensation.

* * * * *